United States Patent

Huber et al.

[11] Patent Number: 6,001,412

[45] Date of Patent: *Dec. 14, 1999

[54] METHOD OF MAKING VITAL WHEAT GLUTEN INTO LAYERED FIBERS, APPARATUS THEREFOR, AND NOVEL RESULTING TEXTURED AND PROTEIN-DENATURED FIBER PRODUCTS

[76] Inventors: Cynthia Huber, 5 Knox Mountain Rd.; Nancy Longo, 126 Calef Hill Rd., both of Sanborton, N.H. 03269

[ * ] Notice: This patent is subject to a terminal disclaimer.

[21] Appl. No.: 08/734,424

[22] Filed: Oct. 17, 1996

Related U.S. Application Data

[62] Division of application No. 08/318,130, Oct. 5, 1994, Pat. No. 5,593,717.

[51] Int. Cl.[6] ....................................................... A23J 3/18
[52] U.S. Cl. ............................ 426/656; 426/62; 426/578; 426/622; 99/367; 99/368; 99/373
[58] Field of Search .............................. 426/62, 578, 622, 426/656; 99/367, 368, 373

[56] References Cited

U.S. PATENT DOCUMENTS 5,593,717   1/1997   Huber et al. ............................ 426/656

FOREIGN PATENT DOCUMENTS 1345168   1/1974   United Kingdom .

*Primary Examiner*—Helen Pratt
*Attorney, Agent, or Firm*—Rines & Rines

[57] ABSTRACT

A method of and apparatus for transforming the clumped untextured putty-like and high viscoelastic adhesion physical and chemical properties of hydrated vital wheat gluten into a loose layered minimally adhering serated permanently textured fiber strand structure by mixing vital wheat gluten with grain flour and hydrating the mixture, and then appropriately appropriate shredding, steaming and hot moisture denaturation of the fiber protein, enabling the creation of moisture-absorbed textured wheat gluten analogs for ground meat fiber products, such as hamburger and the like.

16 Claims, 4 Drawing Sheets

METHOD OF MAKING VITAL WHEAT GLUTEN INTO LAYERED FIBERS, APPARATUS THEREFOR, AND NOVEL RESULTING TEXTURED AND PROTEIN-DENATURED FIBER PRODUCTS

This application is a division of parent application Ser. No. 08/318,130, filed Oct. 5, 1994, now U.S. Pat. No. 5,593,717.

The present invention relates to wheat gluten extracts and products produced therefrom, being more particularly directed to a novel process for transforming or converting the normal inherent putty-like mass and relatively high viscoelastic adhesion properties of hydrated vital wheat gluten into novel serated layered fiber strand structures of relatively low adhesion properties.

BACKGROUND

For many years, the value of vital wheat gluten extracted from wheat flour or berries has been recognized, primarily for its natural protein value for food products, and for its physical and chemical properties, when hydrated, of increasing the viscosity of, for example, flour batters and substantially improving batter adhesion; and, in meat and poultry products and the like, for adhesively binding, extending or filling, and, indeed, providing a chewy texture.

Various processes have been developed for deriving the vital wheat gluten from wheat flour or berries, including the "dough" or "Martin" process in which hydrated and kneaded flour is formed into a cohesive elastic dough and is continuously washed to elute the starch grandules, or to screen out the starch liquors. Illustrative examples of techniques are described in U.S. Pat. Nos. 3,790,553; 3,851,085; and 4,132,566.

Until the discovery underlying the present invention, it is believed that uses of vital wheat gluten have had to be confined to applications that can tolerate its highly viscoelastic putty-like dough properties, namely, as in an additive in baking batters, and for meat, fish and poultry products where the addition of the gluten provides "valuable binding, adhesion, emulsification and water binding qualities" (Midwest Grain Products [Kansas] bulletin, "Challenging The Eighties", pages 32–35).

The putty-like, highly cohesive and non-textured properties in the hydrated gluten solid or massive "dough" have relegated hydrated vital wheat gluten to uses just as a binder or "glue"-like additive where it is physically intermixed and visually lost in the main product or ingredients. The total lack of texture let alone lack of open fiber-like texture and appearance, have no theretofore made it even a serious candidate as the primary constituent for a close analog for ground meat; and the high sticky viscoelastic properties further distant it from the tender fiber-layer taste sensation and cutting characteristics of, for example, a meat hamburger.

In accordance with basic discoveries made in achieving the present invention, however, a technique was surprisingly found radically and permanently to alter or transform both the physical and chemical properties of vital wheat gluten, particularly when hydrated, amazingly to change the physical characteristics from a clump of tough stretchable untextured "putty" to layered aerated loosely packed fiber strand textured structures, closely and substantially indistinguishably simulating the texture of ground beef or other meat; and chemically to denature the protein and otherwise suppress the activity of the originally high viscoelasticity of the gluten, just retaining enough to enable the strands to stray together in an analogous way to ground beef and the like—and with substantially identical physical appearance and mouthfeel, chew and taste sensation.

To achieve this remarkable transformation of normal physical and chemical properties, long thought to be inherent in hydrated vital wheat gluten, moreover, it was necessary to go in a direction absolutely contraindicated in this art. This art had thought that "gluten can sustain its unique properties when subjected to heat, unlike other hydrated proteins which undergo substantial changes when heated to critical temperatures" ("Challenging the Eighties", supra, page 34). Under the discovery of the present invention, quite to the contrary, it has now been found how to condition and subject the hydrated gluten to heat to achieve very substantial permanent changes in both chemical and physical characteristics that indeed give rise to the novel results of this invention.

In view of this surprising transformation, moreover, for the first time, vital wheat gluten can be used as the principal ingredient itself in producing very close wheat analogs to ground meats, hamburgers, sausages, and the like.

OBJECT OF INVENTION

An object of the present invention, accordingly, is to provide a new and improved method or process of transforming hydrated vital wheat gluten from its natural cohesive, putty-like adhesive and high viscoelastic physical and chemical characteristics, to novel layered aerated loosely packed fiber strands with minimal low viscoelasticity.

A further object is to provide, through use of this novel process, a very close gluten analog to meat fiber products such as hamburger, meat loaf, sausages and the like.

Other and further objects will be described hereinafter and are more particularly delineated in the appended claims.

SUMMARY

In summary, however, from one of its important viewpoints, the invention embraces a method of permanently transforming the clumped putty-like untextured mass and relatively high viscoelastic adhesion physical properties of hydrated vital wheat gluten into a loose layered minimally adhering aerated textured fiber strand structure, that comprises, intimately mixing flour with vital wheat gluten powder in the mixture; substantially room-temperature hydrating the mixture to enable the absorption of water by the mixture of expand the gluten into a less viscoelastic mass; shredding the mass into a plurality of separated streams of elongated continuous fibers; dropping the separate strands under the action of gravity as a loose aerated deposit upon a retaining surface; immediately subjecting the deposit to heated moisture contacting with the separate fibers throughout the deposit; continuing the application of heated moisture for a sufficient time for the protein of the separate fibers within the deposit to become substantially denatured, to remove the bulk of the viscoelastic adhesion properties of the gluten while retaining only slight adhering of the fibers; and permitting evaporation of excess moisture from the deposit to produce a loose layered aerated permanent fiber texture structure of relatively low retained viscoelasticity.

Preferred and best mode conditions for operating the method and novel products produced thereby, particularly ground-meat wheat gluten analogs, are hereinafter described in detail.

BRIEF DESCRIPTION OF THE DRAWINGS

The invention will now be described in connection with the accompanying drawings, FIG. 1 of which is schematic sketch illustrative of the non-textured clumped putty-like, high viscoelastic properties of hydrated vital wheat gluten;

FIG. 8 is a side elevation of an apparatus of applying the technique of the invention to produce a fiber-like textured product analog of ground beef and the like;

FIG. 9 is a modification introducing a forming step for shaping an analog "hamburger" pattie or the like.

DESCRIPTION OF INVENTION

Figure 1:
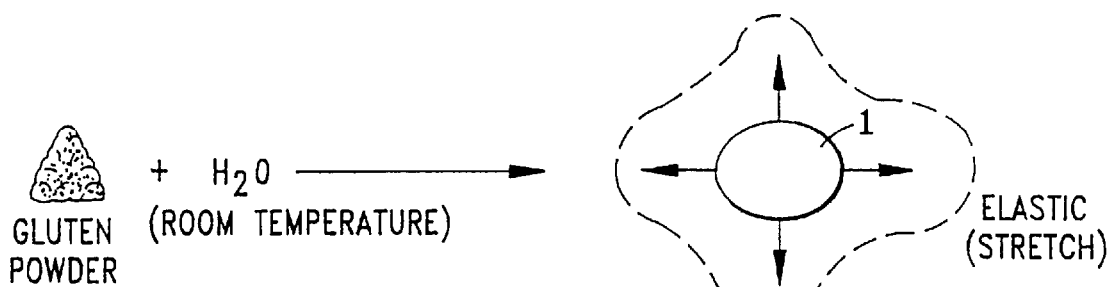
Figure 2:
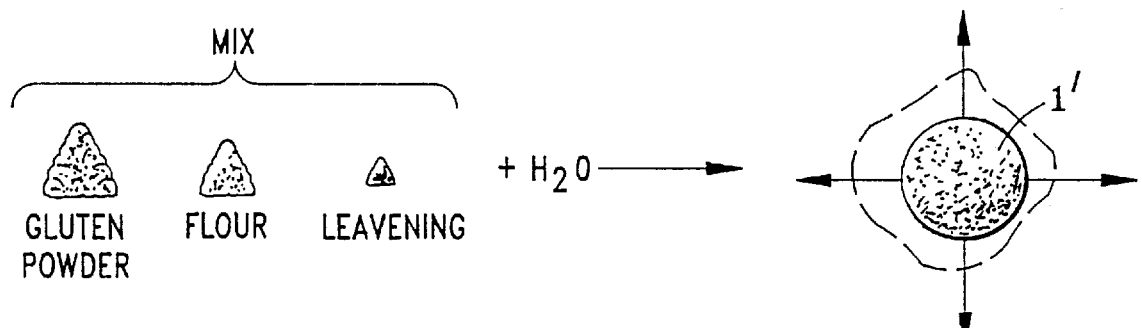
FIG. 2 is a similar sketch of the markedly reduced viscoelastic and somewhat spotted properties produced when a filler of flour and some nutritional leavening is admixed with the gluten powder before hydration.
Figure 7:
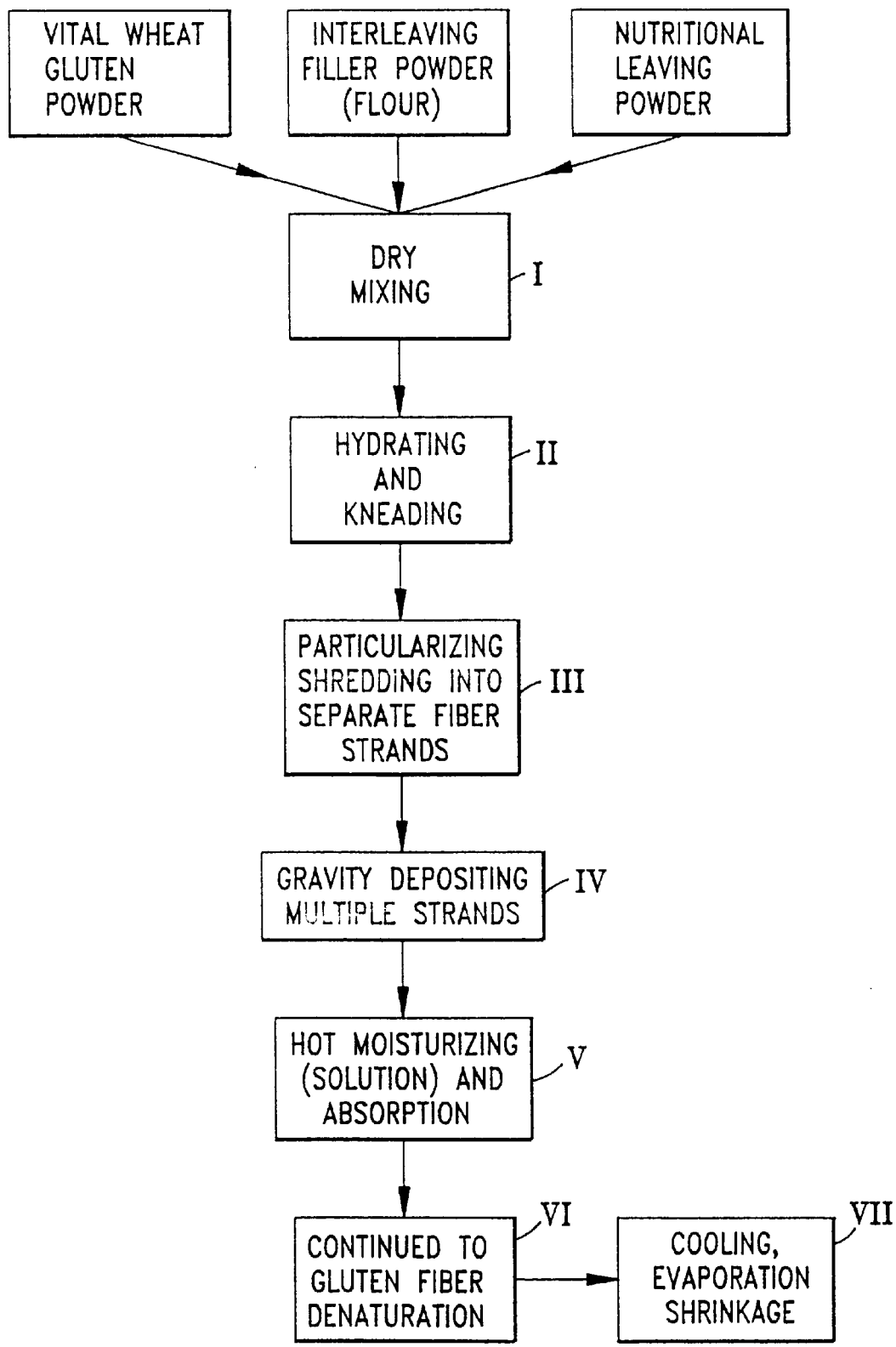
FIG. 7 is a process flow diagram of the gluten-properties physical and chemical transforming process of the invention.

The first step in the transformation of the normal physical and chemical characteristics of hydrated wheat gluten from its usual clumped, untextured, putty-like mass state, with high viscoelasticity—rubbery and adherently binding and elastically resistant to stretching and fracture, as schematically shown at 1 in FIG. 1—resides in introducing, intimately and thoroughly mixed and interleaved throughout the initial vital wheat gluten powder a substantial quantity of particulated filler such as ground grain flour, and preferably a small amount of admixed nutritional (not baker's) yeast, as shown in FIG. 2 and labelled as the first step I of the process flow chart of FIG. 7. Upon appropriate hydration, this has been found very substantially to reduce the viscoelasticity and high elastic tensile strength of the hydrated product, again as visually illustrated in FIG. 2 by the much narrower outer dotted stretch profile than in FIG. 1. While not desiring to be bound by theories, it strongly appears that the introduction of the flour particles in sufficient quantity between wheat gluten powder prevents the high degree of clumping and tight adhesive binding that occurs when all the gluten powder particles are contiguous. Whether this is or is not the totally correct theory, it is sufficient to describe the steps of the process of the invention as they actually have been found to occur in practice.

Figure 3:
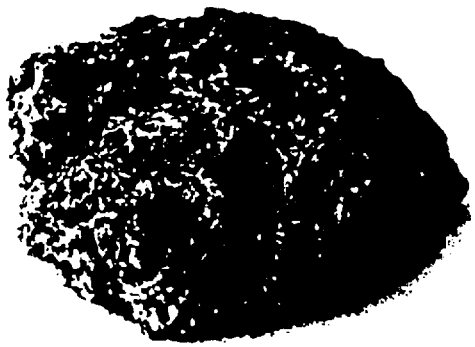
FIGS. 3 and 4 are photographs of the respective actual dry admixture and the hydrated form thereof of FIG. 2.

Using, as an example, Midwest Grain Products, Inc. (Kansas) pulverized dehydrated vital wheat gluten powder in about a half pound sample (FIG. 1), and hydrating and kneading with about a cup of water at room temperature, tensile strength measurements showed the high viscosity requirement of about 11 to 12 pounds of stretching force to fracture off a piece of the mass. With the same size sample of the dry wheat gluten powder thoroughly admixed with whole grain wheat flour in proportion about 1 part gluten-to-half a part flour by weight, FIGS. 2 and 3, the similarly hydrated product (step II in FIG. 7) was found to have a greatly reduced tensile strength, requiring only about one to one and a half pounds to pull off a piece from the much more pliable mass—a considerable reduction in viscoelasticity and a much looser feel for the product.

Figure 4:
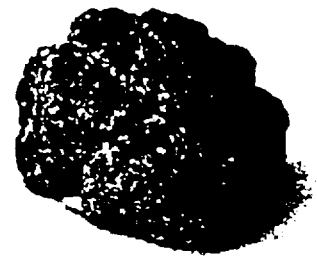

A further and preferred additive to the dry mix is a leavening agent of the nutritional yeast type, FIGS. 2 and 7, such as that of Universal Foods of Wisconsin, which, unlike baker's yeast, provides both flavor and, during hydration, a gentle generation of gaseous bubbles that cause further expansion and some aeration texturing, as at 1' in FIG. 2 and in the product of FIG. 4.

Figure 5:
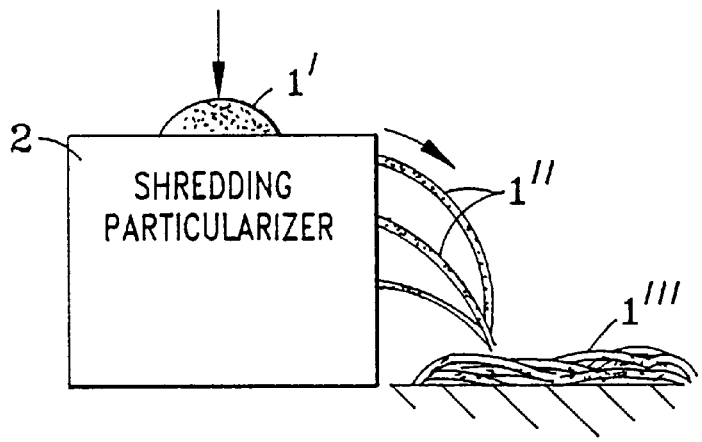
FIG. 5 is a schematic diagram of shredding or particularizing the hydrated mixture of FIGS. 2–4 into rather critically dimensioned separated streams of fiber-like strands which are allowed to fall freely under gravity into a deposit of loose layers of aerated fiber strands on a retaining surface.
Figure 6:
FIG. 6 is an actual photograph of such a deposit showing its fiber-textured, particularized appearance.

In FIG. 5 and step III of the process flow chart of FIG. 7, the hydrated product 1' (preferably in the proportion of about 12 ounces of dry mixture to about 8 ounces of water) is fed into a particularizing shredder or grinder 2 to shred and comminute the mass and pressure exude or squeeze and stretch into a plurality of adjacent but separated fiber strands 1". The strands fracture as they fall under the influence of gravity (step IV, FIG. 7) and deposit (preferably with about an 8-inch fall, more or less) as loose random layers of strands at 1'''. This stripping of thin strands from the mass and exuding as fiber streams further reduces the already lowered visco-elasticity and creates a true elongated fiber texture.

If these are immediately subjected to heated moisture permeating within the total deposit, step V, FIG. 7, before the strand layers have time to coalesce, the hot moisture will permeate into and uniformly through the loose aerated multi-layer fiber strand deposits 1''', permit moisture absorption and thickness swelling of the deposit as the hot moisture fills the voids in between and amongst the fiber layers. With fiber strands of rather critical cross-dimension of about 0.3 inch, as later more fully discussed, and a heated water solution in which they are immersed of the order of about 212° F., it has been found that the continued application of the hot moisture contacting and enveloping the fibers for the order of about 25 minutes, step VI, FIG. 7, substantially completely chemically de-natures the protein, permanently eliminating the bulk of the gelatulous viscoelastic protein "glue", and physically assuming permanent fibrous texture characteristics.

The process of the invention has thus transformed the untextured clump putty, unmanageable elastic adhesively binding mass characteristics of hydrated wheat gluten, tough and resistant to fracturing, into a totally manageable low viscoelastic open fiber-strand textured structure, pliable and readily chewable and separable.

As before stated, this remarkable physical and chemical transformation now allows uses of wheat gluten previously impossible with its natural hydrated characteristics, and enables uses that are primarily the gluten itself, as distinguished from mere additive and binder uses in other materials. Among such new applications, as previously discussed, is the important simulation of meat fiber products.

With the above fiber strand cross-dimensions, the fiber texture closely resembles the fibers of ground beef, fortuitously providing a ready wheat gluten analog of hamburger when the transformation method of the invention is applied to producing such a product. In this even, appropriate spices, flavorings and vegetable coloring may be introduced into the mixture closely to simulate the appearance and flavors of ground beef or other meat in the myriad of applications for different ethnic tastes, including, for example, Mexican, middle and far eastern and Italian flavors, among others.

After cooling and some evaporation and shrinkage, step VIII in the process flow chart of FIG. 7, that analog product may be broiled, boiled, fried, grilled or otherwise prepared in the same manner as ground beef or the like, or refrigerated or flash-frozen for subsequent final cooking.

Figure 8:
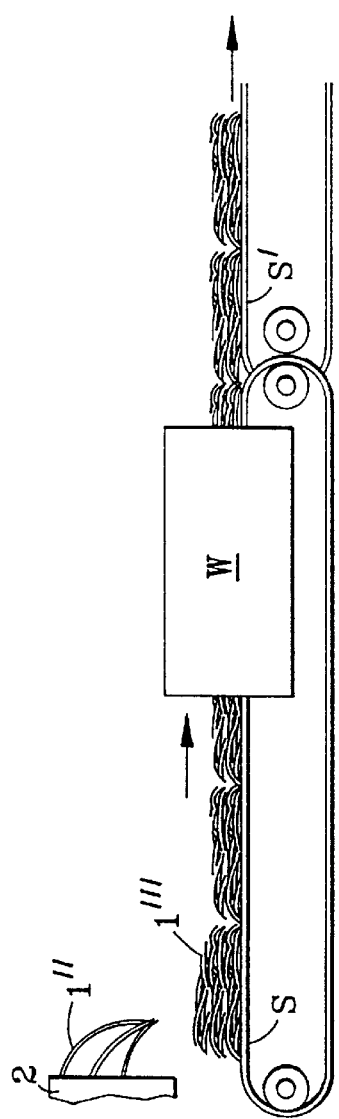

A suitable apparatus for the hot moisture denaturing steps V and VI for the production of ground meat protein analogs is shown in FIG. 8, where the strands 1" are deposited upon a screen belt S and carried through a hot water bath or tank W, immersing the deposits 1" in the heated water as they are carried through the tank. As before stated, nearly a half an hour of such immersion at about 212° F. has been found to be sufficient to effect the substantial denaturation of the gluten protein and the permanent desired alteration of transformation of the physical and chemical properties as above described. The heated bath may also contain appropriate flavorings or colorings, if desired. The product may be totally "vegetarian", or, if desired, in the mixture hydration stage or in the hot moisture immersion stage or otherwise, meat bullion (beef, pork, poultry, etc.) or other flavorings may be used to produce a genuine meat flavor to the gluten meat analog product.

Figure 9:
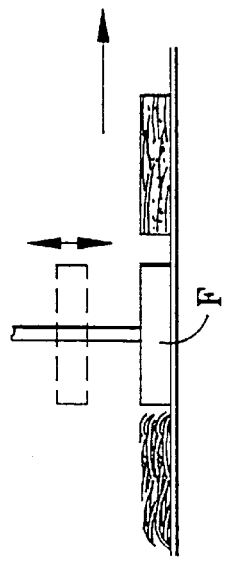
Figure 11:
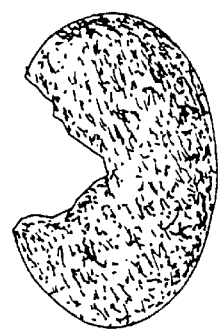
FIGS. 10 and 11 are actual photographs of the top and section of such an analog product.
Figure 10:

It has further been found most desirable for preventing separation or friable effects during the heated moisture treatment, to restrain the deposit from movement, such as tumbling that can break up the deposit, or elongation. The use of a screen surface S admirably serves this function since, as the strands are deposited at 1'", they tend to stick or lock into the screen openings. After completion of the denaturing process at the far end of the tank W, the screen belt s may reverse direction, as shown, and transfer the product to a further belt S'. Clearly other well-known apparatus may also be adapted for these purposes, as well.

Where shaped patties, loafs or other forms are desired, instead of chunks suitable, for example, for pizza toppings or pasta dishes or the like, a shaping form may be introduced before the prompt hot moisture treatment as at F in FIG. 9. FIGS. 10 and 11 show the actual substantially indistinguishable appearance and texture from meat hamburger patties; and the chew, mouthfeel and taste sensation are also indistinguishable—a totally grain protein realistic analog, and with the added advantage of no fat.

With this fiberizing by comminuting or the grinding-shredding of the mass mixture and forcing or squeezing exuded stretched strands of appropriate cross dimension that are then denatured, the per unit volume adhesion or viscoelasticity is much further reduced to a very low value, totally comparable to ground meat, and just enough to hold the analog together. As previously stated, however, a certain criticality to cross-dimension of the exuded strands has been noted. With small cross-dimensions of the order of about 0.1 inch or less, minimal or no fiber texture results after protein denaturation, the product appearing solid, mushy and friable. With strands as large as about 0.6 inch or greater, the strands tend to clump and an uneven texture results. The before-mentioned cross-dimension range of the order of about 0.3 inch has experimentally been found consistently to produce uniform textured fiber layers throughout the product.

The relative proportion of grain flour or other filler in the dry mix may be varied for different applications, generally ranging from about 1:0.5 to about 1:0.15, by weight. The preferred grind of whole grain wheat flour has been found to be 3–265 milling grind, in order to be of appropriate grain size for its required function, before described. The proportion of nutritional yeast is preferably of the order of about eight percent by weight. The added water or hydration is preferably in the ratio of about 12 ounces dry mix to about 8 ounces, as before mentioned.

Further modifications, however, will occur to those skilled in this art and such are considered to fall within the spirit and scope of the invention as defined in the appended claims.

What is claimed is:

1. A method of permanently transforming clumped putty-like untextured mass and relatively high viscoelastic adhesion physical and chemical properties of hydrated vital wheat gluten into a loose layered minimally adhering textured fiber strand structure and forming the structure into a shape and texture simulating that of the layered fibers of one of meat and poultry, that comprises, intimately mixing flour with vital wheat gluten powder to interleave with and separate the gluten powder particles in a mixture; at substantially room temperature, hydrating the mixture to enable the absorption of water by the mixture to expand the gluten into a less viscoelastic mass; shredding the mass into a plurality of separated streams of elongated continuous fibers and dropping as a deposit upon a retaining surface; subjecting the deposit to heated moisture along the separate fibers within and throughout the deposit; continuing the application of heated moisture for a sufficient time for protein of the separate fibers within the deposit to become substantially denatured, to remove the bulk of the viscoelastic adhesion properties of the gluten; removing moisture from the deposit to produce a loose layered permanent fiber structure of relatively low retained viscoelasticity; and shaping the deposit to simulate the appearance and texture of said meat or poultry to provide a wheat gluten analog thereof.

2. A method as claimed in claim 1 and in which a leavening agent is added to said mixture before completion of the hydrating.

3. A method as claimed in claim 1 and in which said shaping comprises forming the deposit into wheat-gluten analogs of one of meat and poultry pieces, chunks, ground product, patties, loaves and sausages.

4. A method as claimed in claim 3 and in which the analogs are formed as vegetarian no-fat analogs.

5. A method as claim in claim 3 and in which one of ethnic flavorings, spices and meat and poultry flavors are added to the deposit.

6. A method as claimed in claim 1 and in which the shaping precedes the application of heated moisture.

7. A method as claimed in claim 6 and in which the shaping is in the form of patties.

8. A method as claimed in claim 7 and in which the patties are deposited upon and restrained by a moving belt or screen having openings, with the patties sticking and locking about the openings as they are subjected to the heated moisture, creating a permanent external texturizing pattern on the patties with the pattern defined by the openings.

9. A method as claimed in claim 1 and in which the deposits are deposited upon and restrained by a moving openings-provided belt with the deposits sticking and locking onto the belt openings as they are subjected to the heated moisture.

10. Apparatus for transforming clumped putty-like untextured mass and relatively high viscoelastic adhesion physical and chemical properties of hydrated vital wheat gluten into a loose layered minimally adhering textured fiber strand structure and forming the structure into a shape and texture simulating that of the layered fibers of one of meat and poultry, and receiving flour mixed with vital wheat gluten powder to interleave with and separate the gluten powder particles in a mixture at substantially room temperature, hydrating the mixture to enable the absorption of water to expand the gluten into a less viscoelastic mass; means for shredding the mass into a plurality of separated streams of elongated continuous fibers, dropping as a deposit upon a retaining surface; means for subjecting the deposit to heated moisture along the separate fibers within and throughout the deposit; means for continuing the application of heated moisture for a sufficient time for protein of the separate fibers within the deposit to become substantially denatured, to remove the bulk of the viscoelastic adhesion properties of the gluten; means for removing moisture from the deposit to produce a loose layered permanent fiber structure of relatively low retained viscoelasticity; and means for shaping the deposit to simulate the appearance and texture of said meat or poultry to provide a wheat gluten analog thereof.

11. Apparatus as claimed in claim 10, and in which the shaping means is deposed after the shredding means and before the heated moisture subjecting means.

12. Apparatus as claimed in claim 11 and in which the shaping means produces successive cylindrical shapes.

13. Apparatus as claimed in claim 10 and in which a moving openings-provided belt is disposed to receive the deposits and to restrain the same against movement as they are carried to and through the heated moisture, with the deposits on the belt locking into the belt openings.

14. Apparatus as claimed in claim 13 and in which the belt is of screen form.

15. A wheat gluten analog for pieces, patties, loaves and sausages of ground meat or poultry consisting of loose layers of moisture-absorbed and swelled elongated fiber strands of heat-denatured vital wheat gluten.

16. A method of permanently transforming clumped putty-like untextured mass and relatively high viscoelastic adhesion physical and chemical properties of hydrated vital wheat gluten into a loose layered minimally adhering textured fiber strand structure and forming the structure into a shape and texture simulating that of the layered fibers of one of meat and poultry, that comprises, intimately mixing flour with vital wheat gluten powder to interleave with and separate the gluten powder particles in a mixture; at substantially room temperature, hydrating the mixture to enable the absorption of water by the mixture to expand the gluten into a less viscoelastic mass; shredding the mass into streams of fibers and depositing the same upon a retaining surface; shaping the deposits to simulate the appearance of meat or poultry products; carrying the shaped deposits upon and restrained by a moving openings-provided belt or screen, with the shaped deposits sticking and locking into the openings; subjecting the deposits to heated moisture as they are carried by the belt or screen and for a sufficient time for protein of the separate fibers within the deposits to become substantially denatured, to remove the bulk of the viscoelastic adhesion properties of the gluten, while creating permanent external texturing of the deposits with the pattern defined by the openings; and removing moisture from the deposit to produce a loose layered permanent fiber structure of relatively low retained viscoelasticity simulating the appearance of said meat or poultry products to provide a wheat gluten analog thereof externally patterned with said pattern.

* * * * *